J. P. SCOVILL.
TOBACCO STEMMING MACHINE.
APPLICATION FILED APR. 25, 1918.

1,388,487.

Patented Aug. 23, 1921.
6 SHEETS—SHEET 1.

Inventor
J. P. Scovill
By John D. Morgan
Attorney

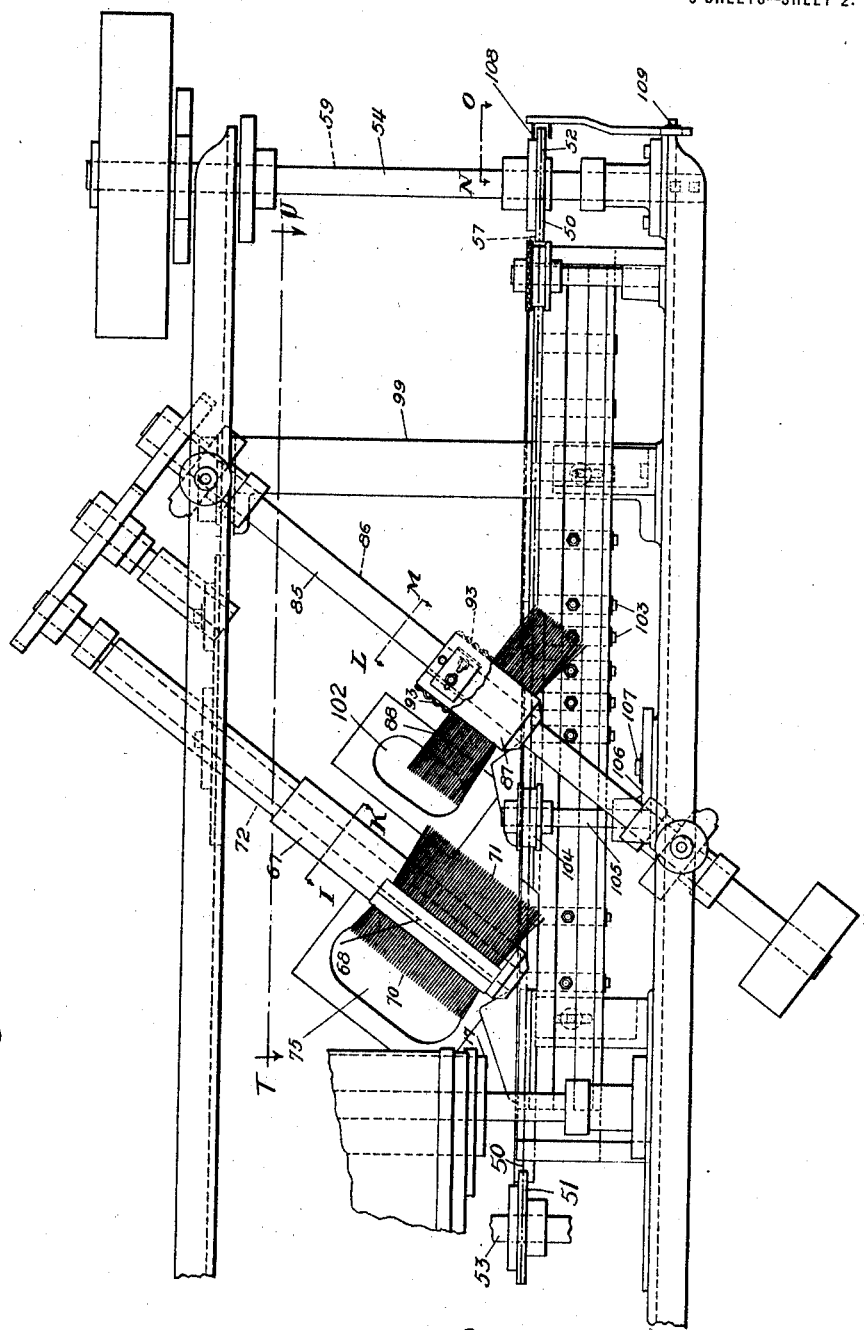

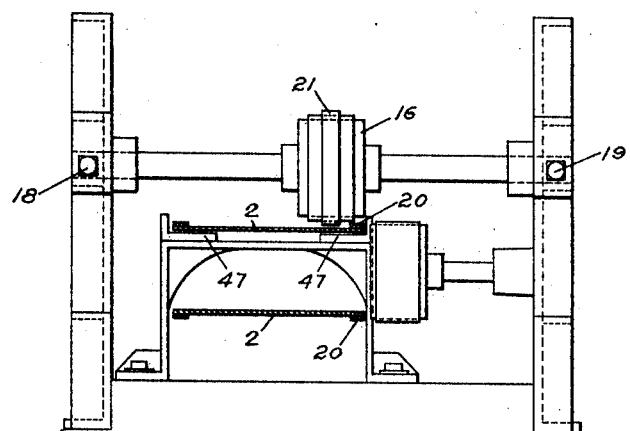
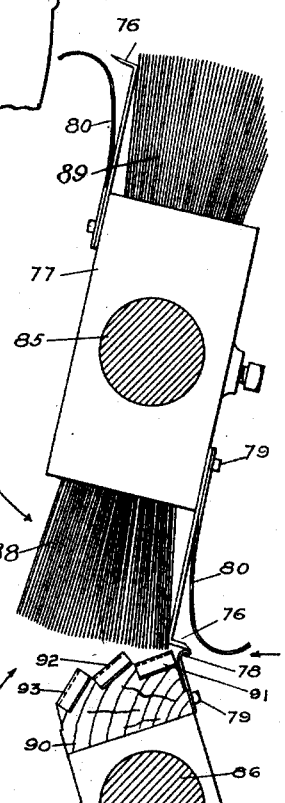
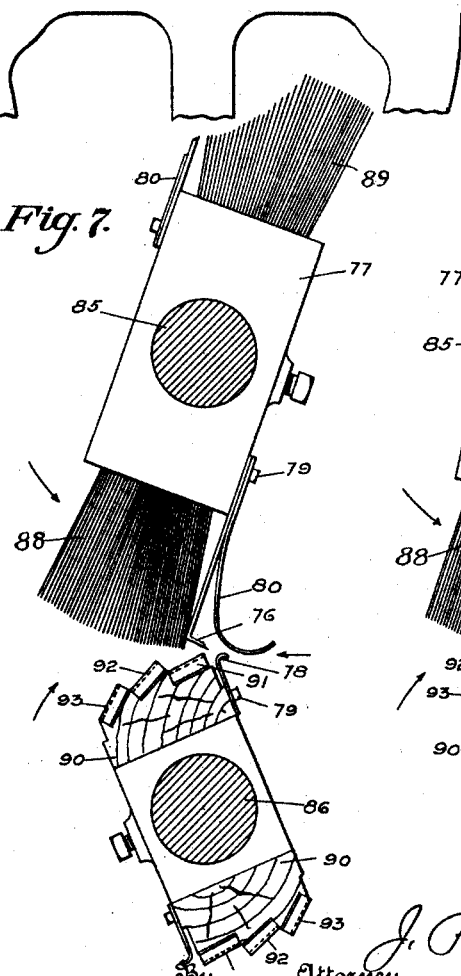
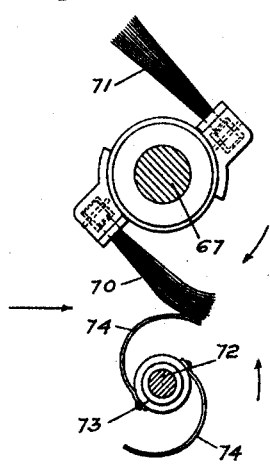

J. P. SCOVILL.
TOBACCO STEMMING MACHINE.
APPLICATION FILED APR. 25, 1918.
1,388,487.
Patented Aug. 23, 1921.
6 SHEETS—SHEET 4.
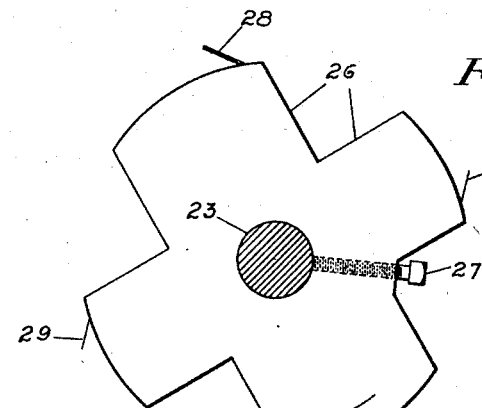
Fig. 3.
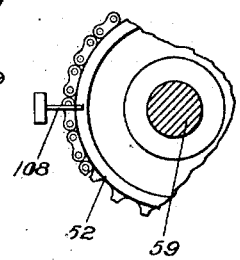
Fig. 9.
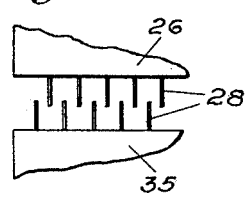
Fig. 10.
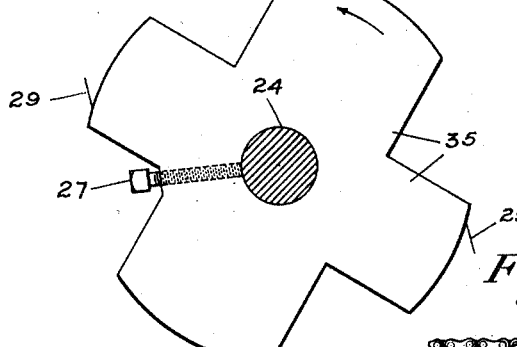
Fig. 5.
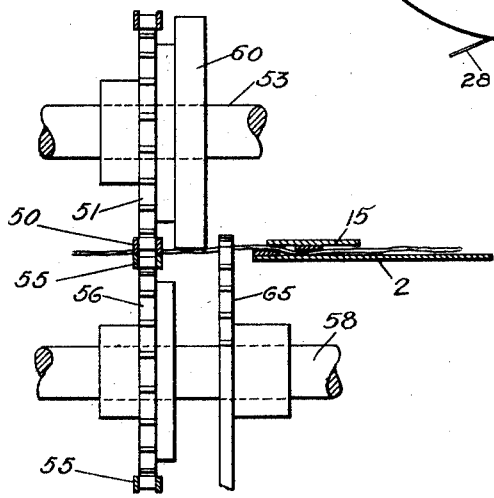
Fig. 4.
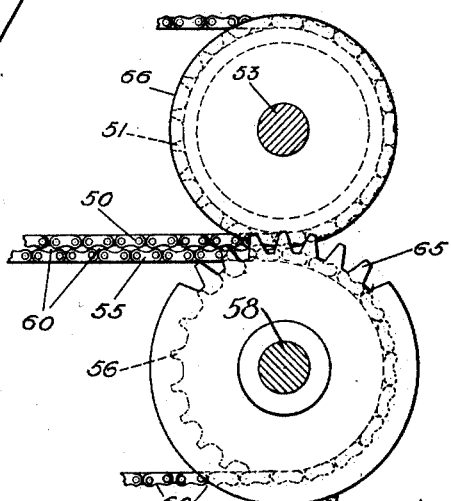
Inventor
J. P. Scovill
By Attorney
John D. Morgan

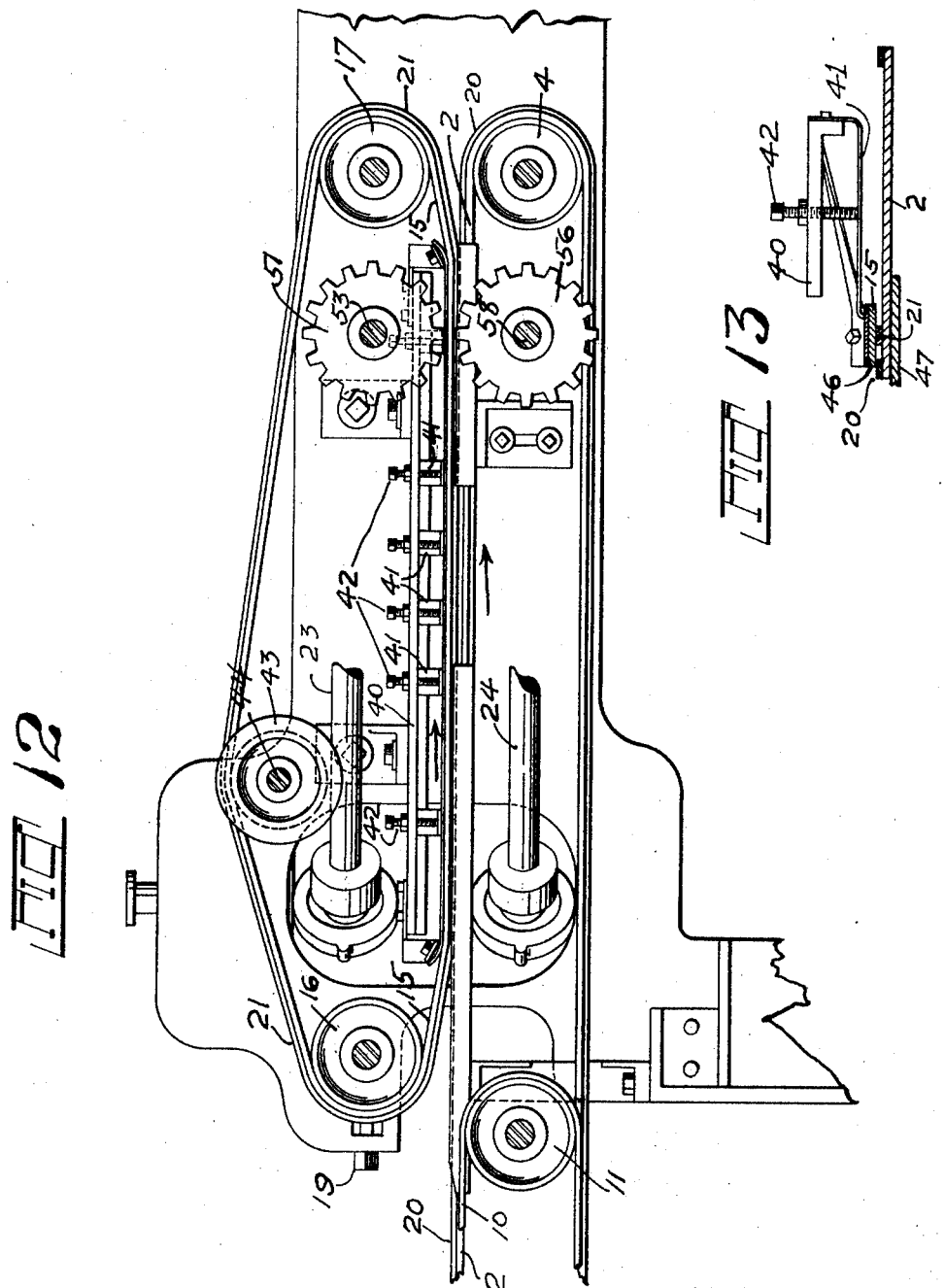

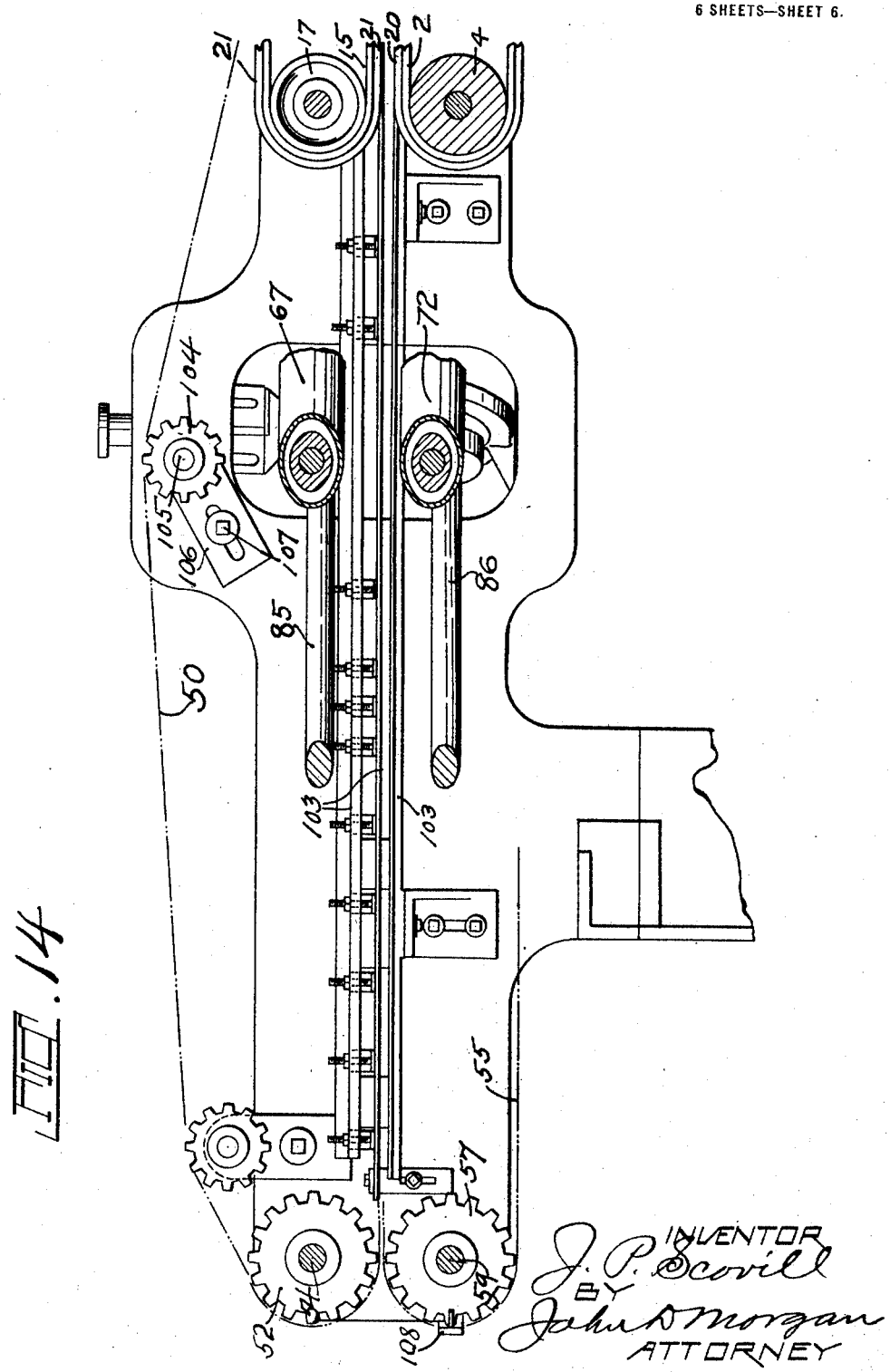

UNITED STATES PATENT OFFICE.

JAMES P. SCOVILL, OF TROY, NEW YORK, ASSIGNOR, BY MESNE ASSIGNMENTS, TO TOLHURST MACHINE WORKS, A CORPORATION OF NEW YORK.

TOBACCO-STEMMING MACHINE.

1,388,487. Specification of Letters Patent. Patented Aug. 23, 1921.

Application filed April 25, 1918. Serial No. 230,797.

*To all whom it may concern:*

Be it known that I, JAMES P. SCOVILL, a citizen of the United States, residing at Troy, in the county of Rensselaer and State of New York, have invented new and useful Improvements in Tobacco-Stemming Machines, of which the following is a specification.

The invention relates to tobacco stemming machines and in certain respects the present invention is an improvement upon my prior Patents No. 1,067,147 and No. 1,067,148, although in these and other respects my present invention is applicable to other tobacco stemming machines or for independent use.

Objects and advantages of the invention will be set forth in part hereinafter, and in part will be obvious herefrom, or may be learned through practice with the invention; the same being realized and attained through the instrumentalities and combinations pointed out in the appended claims.

The invention consists in the novel parts, constructions, arrangements, combinations and improvements herein shown and described.

The accompanying drawings, herein referred to and constituting a part hereof, illustrate one embodiment of the invention, and together with the description serve to explain the principles thereof.

Of the drawings:—

Figure 1 and Fig. 1ᵃ taken together are a top plan of a machine embodying the invention;

Fig. 2 is a transverse vertical section on line A—B of Fig. 1, showing the primary conveyers;

Fig. 3 is a fragmentary vertical section on line C—D of Fig. 1 showing the first stemming mechanism;

Fig. 4 is a fragmentary vertical section on line E—F of Fig. 1 showing the two sets of conveyers and the intermediate transferring and forwarding device;

Fig. 5 is a similar view on line G—H of Fig. 1;

Fig. 6 is a fragmentary vertical section on the line I—K of Fig. 1ᵃ, showing the leaf turning and smoothing devices;

Fig. 7 is a like view on line L—M of Fig. 1ᵃ, showing the final stemming devices;

Fig. 8 shows the same mechanism but during the stem cutting operation;

Fig. 9 is a vertical fragmentary view of the stem delivery substantially on line N—O of Fig. 1ᵃ;

Fig. 10 is a fragmentary view looking at Fig. 3 from the side to show the preferred relation of the stemming fingers; and Fig. 11 is a fragmentary edge detail of one of the stemming cutters.

Fig. 12 is a fragmentary, sectional elevation, substantially on line P—Q of Fig. 1;

Fig. 13 is a fragmentary, detail section on line R—S of Fig. 1, showing a section through the pressure regulating devices for the belt and chain conveyers; and Fig. 14 is a fragmentary, sectional elevation, substantially on line T—U of Fig. 1ᵃ.

Figure 1:
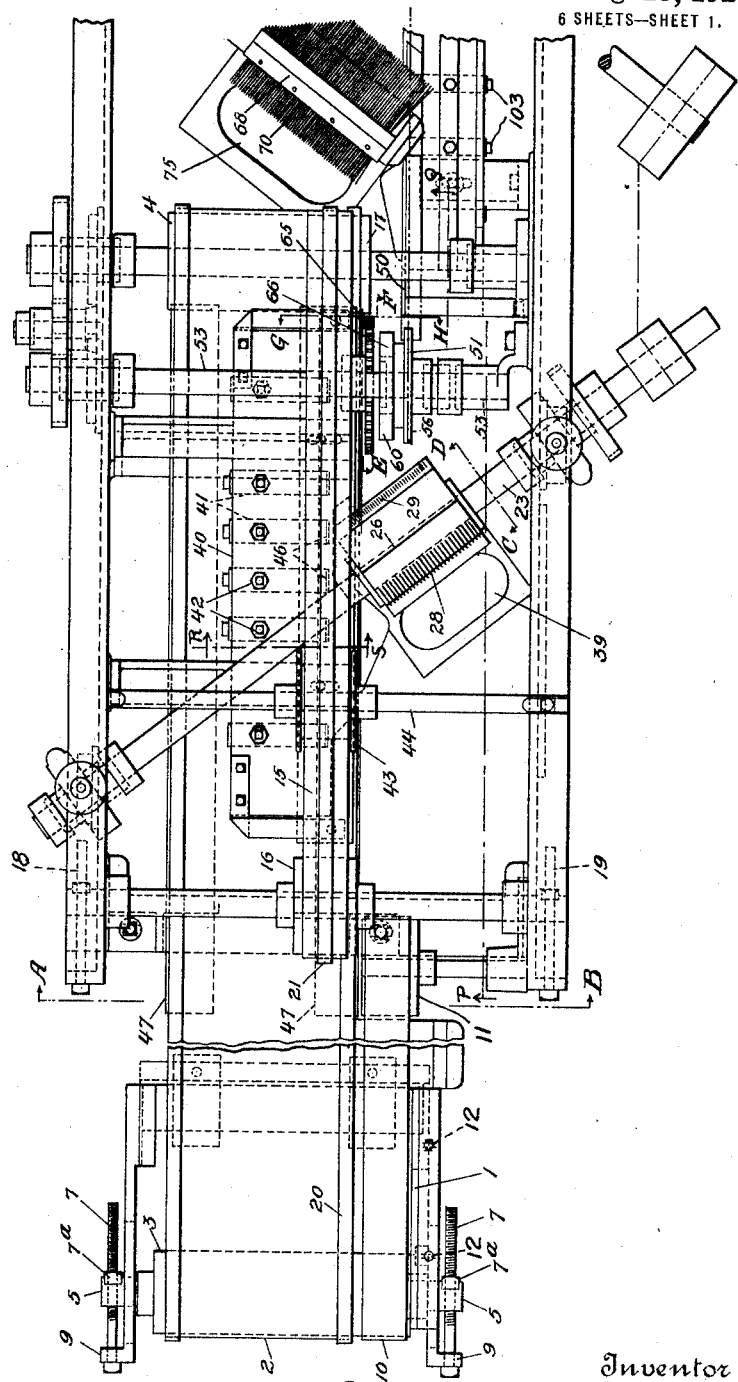

Referring to the accompanying drawings, illustrating by way of example one embodiment of the invention, means are provided whereby the leaf tobacco is alined or registered relatively to the initial feeding devices so as to be fed thereto in a definite predetermined relation or position.

As embodied there is provided for this purpose a board or alining strip 1 which is adjustably positioned along the edge of the traveling conveyer belt upon which the leaf tobacco is laid for feeding into the machine, and is thereby alined by the operative attending the machine, so that the leaf will enter the conveyers and be carried through the machine in proper and efficient position or location. The alining board 1 is movable or adjustable, by means of bolt and slot connections 12, toward and away from the conveyer to transversely position the leaf with respect thereto. The operative in placing the leaf tobacco upon the conveyer belt, places the stems with their ends in abutment against the board 1, and roughly or freely distributes the handful of leaf along the belt, whereby it enters the machine in practically uniform transverse alinement and is also distributed along the conveyer belt so as to maintain a practically constant and uniform supply of the leaf to the machine.

The embodied form of conveying means comprises a relatively broad and preferably horizontally arranged belt 2, running over supporting and driving rollers 3 and 4, journaled in the machine frame. In the present instance the roller 4 is driven, and the roller 3 is adjustably journaled to regulate the tension of the belt 2. For this purpose, the shaft 5 of the roller 3 has threaded connection with screws 7 mounted at 9 in the machine frame, and provided with nuts 7ª, whereby the roller 3 may be moved longitudinally to regulate the tension of the belt 2, the roller running free on the so slidable shaft 5.

There is provided in the present embodiment in coöperative relation with the belt 2 an auxiliary belt 10, running alongside belt 2, and upon which rest the stem ends of the leaf tobacco as it is deposited by the operative and alined against the gage 1, and is then carried forward by the belts 2 and 10. The belt 10 runs over the roller 3, and over a short roller 11, which is journaled in the forepart of the machine.

Coöperating in the present embodiment with the belt 2 to grip the leaf tobacco after it has been deposited and alined upon the forward part of the belt 2 is an endless belt 15. Belt 15 is located above and extends along one side of the belt 2, the lower reach of belt 15 running on and in the same direction as the upper reach of belt 2. The belt 15 runs over supporting and driving rollers 16 and 17, journaled respectively in the machine frame. As embodied, the roller 17 is driven, and the roller 16 is provided with tension adjustments to control the tension of the belt 15, which adjustments may include the screw-threaded rods 20 and 19, and be generally similar to the like adjustments already described for the belt 2, and need not be described in further detail.

Means are provided for firmly gripping and holding in position the leaf as it is conveyed forward between the belts 2 and 15 and preferably for effecting this by an angular or other gripping flexure of the leaf between the conveyer members 2 and 15. This grip is maintained upon the leaf tobacco as and while it is subjected to a partial stemming operation, and preferably while the upper or butt end of the leaf is stemmed off backwardly or toward the stalk end of the stem.

As embodied (see Figs. 1 and 2) the means for effecting the flexing and preferably angular grip upon the leaf, as described, comprises a strip or welt 20 of suitable material, such as leather, arranged and fixed longitudinally of and adjacent to the edge of the belt 2. A coöperating gripping device is provided upon the belt 15, and as embodied a similar strip or welt 21 of leather or other suitable material is fixed to and disposed longitudinally upon the belt 15, and inwardly of the welt or strip 20 on belt 2. The gripping devices, such as the strips or welts 20 and 21 are spaced with respect to each other so that the tobacco leaf is firmly gripped crosswise of the leaf and is held against movement relatively to the conveyers, but in such manner and to such degree that the stems will not be crushed and thereby weakened or broken thereby rendering the stemming action as efficient as possible while avoiding waste and dropping by the machine, and with these ends in view one of the belts is shiftable or movable sidewise to so regulate or adjust the grip on the leaf.

The conveyer 2 may be provided with gripping means at either side thereof, thereby rendering the belt interchangeable side for side in the machine. These devices which present the tobacco leaf to the first stemming means and convey it therethrough and on beyond, may conveniently be called the first conveyer or conveying means.

The initial stemming means, which in the preferred embodiment of the invention stem the upper portion of the leaf, and preferably considerably the smaller portion thereof, toward the butt, comprises coöperating rotary stemming devices, arranged obliquely or diagonally to the direction or path of travel of the conveyers 2 and 15, and of the leaf tobacco carried thereby. As embodied, two shafts 23 and 24 are journaled in the machine, in oblique or diagonal position as already described. Upon these shafts, respectively, are mounted the coöperating stemming devices 26 and 35, which may be conveniently styled stemming rolls, although they are not necessarily or preferably of cylindrical form.

One of the embodied stemming devices (see Figs. 1 and 3) comprises a body 26 mounted upon shaft 23, and adjusted and held in position longitudinally and angularly thereon by suitable means, such as clamping screws 27. The body 26 is provided with suitable stemming devices for separating the leaf from the stem, such devices being preferably formed of series or rows of leaf engaging and removing devices arranged along, and separated apart around, the body 26 of the "roll". The leaf engaging and removing or stemming devices, as preferably embodied, comprise pins or fingers of wire, spaced and located as just described, the wires being inclined backwardly with respect to the direction of rotation of the roll, as appears in Fig. 3.

In accordance with one feature of the invention, these lines or series of wires spaced apart circumferentially about the roll, vary in character and in their action on the leaf being stemmed, as the lines or series of fingers engage in succession with the leaf. One series 28 consists of relatively stiff or heavy wires or fingers, and a succeeding line or series 29 consists of relatively lighter or resilient wires or fingers, the former preferably being more widely spaced apart and the latter being spaced more closely together. There are two rows of the fingers 28 and two rows of the fingers 29 shown, the respective rows being spaced a semi-circumference apart.

The stemming devices on roll 35 which coöperate with those located on roll 26 and just described, are preferably similar in construction, and need not be described in detail. The coöperating stiff fingers 28 on the rolls 26 and 35 (see Fig. 3) may intermesh slightly or may just come into end contact or alinement, and the series 29 may be similarly arranged. The fingers of each series are spaced apart along the rolls 26 and 35, and also the coöperating series on the two rolls are staggered just sufficiently to permit a stem to pass therebetween without being jammed or broken. The coöperating fingers form stemways of various sizes at their points of coöperation and farther down on the fingers, that is, toward their bases, thereby providing stemways for stems of different sizes. The stemming or removal of the leaf is thus clean and close without damage to or breakage of the stem. The more resilient wires or fingers are adapted to yield as they engage the leaf and to exert a milder action on the leaf in the stemming operation.

In Fig. 3 the arrow 34 represents the direction of travel of the leaf and the direction of rotation of the rolls is shown by the respective arrows thereon. The backward inclination of the stemming fingers gives a very favorable and advantageous action thereof upon the leaf, as the fingers engage the leaf by an oblique movement and recede therefrom by a relatively longitudinal movement. During the stemming action, the leaf tobacco approaches the stemming devices projecting transversely outwardly from between the edges of the conveyer 2 and 15, and traveling at substantially right angles to their own length, and firmly held in the manner described. The stemming devices are rotating at relatively high speed as compared to the speed of the conveyer belts, and therefore the different stemming devices come into operative engagement with each successive traveling leaf a number of times while it is passing in the firm grip of the conveyer mechanism. On first engaging a leaf, the fingers 28 and 29 turn or bend the stems obliquely backwardly, as they travel along, until the stems are substantially in alinement or at right angles to the axes of the stemming rolls.

Means are provided for regulating the pressure between the conveying belts 2 and 15, and in the embodied form thereof, a plate 40 is arranged above the inner or operative reach of the conveyer belt 15. Supported by the plate 40 are a plurality of spring fingers 41 engaging a flexible plate 46, extending longitudinally of the belt and which bears upon the belt 15 at various points thereon, with pressure determined or regulated by the fingers 41. Each of the fingers 41 is provided with a separate tensioning device, the preferred form thereof including a rod or finger 42 for each of the presser fingers 41, the respective rods 42 being screw threaded into the plate 40 with their ends pressing against the respective presser fingers 41, whereby through plate 46 regulating the pressure between the conveyers 2 and 15 at various points therealong, to control the grip on the tobacco leaf as it passes through the stemming devices.

There is a supporting plate 47 beneath the upper reach of the conveyer belt 2 which supports that belt at a fixed level and thus coöperates in the regulation of the gripping action of the conveyer upon the leaf tobacco. A similar support is preferably provided for the opposite side of the conveyer 2. As each finger 41 is pressed downwardly by its pressure regulating screw 42 the pressure between the belts 2 and 15 and thus the gripping force exerted on the tobacco leaf, is correspondingly increased. When the screws 42 are turned backwardly the opposite effect is produced. There is thus provided a nice regulation for each point along the path of travel of the leaf between the conveyers, including its passage through the stemming means. The gripping tension upon the tobacco leaf may thus be nicely regulated at every point and stage of the stemming operation. A supporting and alining pulley 43 is underneath the upper or returning reach of the belt 15, the pulley being mounted upon a shaft 44 carried by the machine frame.

Means are provided for completing the stemming of the leaf, and coöperating therewith, conveying means especially constructed and adapted to handle the partly stemmed leaf and present it in the most advantageous and efficient manner to the second stemming means, which complete the stemming of the leaf. In accordance with certain features of the invention, conveying means are provided for receiving and gripping the stemmed portion of the leaf somewhat spaced apart from each other, and quite regularly spaced apart when there is intelligent and faithful feeding or supplying of the leaf to the machine, and conveying the leaf so held past, through and beyond the second stemming means, which complete the stemming operation. This may conveniently be styled the second conveyer. In connection therewith, intermediately located means are provided for receiving the stems or stemmed portion of the leaf from the first conveyer and leading them into this second conveying mechanism, so that the successive stems may be firmly gripped and be spaced apart for advantageous presentation to and passage through the second stemming means.

This second conveying means is always in engaging relation with respect to the oncoming leaf, and has no special mechanism or actuating mechanism for engaging the stems, but receives them just as they are presented. This conveying means is driven or run at a somewhat higher speed as compared to the first conveyer, as is also the intermediate stem receiving and leading means, just referred to, thereby first straightening the clean portions of the stems from their backwardly inclined position, in which they passed through the first stripping means, and they are gradually and gently turned and straightened with the unstemmed portion of the leaf, preparatory to entering into the second stemming means, which completes the stemming operation. The entire operation is both gentle and gradual so as not to break any of the stems, but is effective to keep the tobacco uninjured and to present it advantageously and efficiently to the second stemming means.

As embodied, this succeeding or second conveyer, having in view the functions, capacities and operation just pointed out, comprises coöperating devices traveling and converging to present a continuously open entrance for the oncoming stems, to receive and firmly grip the successive stems as presented in the operation of the machine, and to carry the leaf forward to the second stemming means.

Said means as embodied comprises sprocket chains adapted to grip the successive stems adjacent the remaining or unstripped portion of the leaf. As embodied, Figs. 1, 4 and 5, an upper sprocket chain 50 is arranged horizontally and somewhat to one side of, and with its forward end passing or slightly overlapping (considered transversely of the machine) the rear end of, the primary conveyers 2 and 15. This sprocket chain runs over sprocket wheels 51 and 52 mounted respectively on shafts 53 and 54, one of which is driven in a suitable manner. The coöperating sprocket chain 55 is arranged just beneath chain 50, and runs on sprocket wheels 56 and 57, mounted respectively on shafts 58 and 59, one of which shafts is driven. The two chains thus have parallel, contacting horizontally disposed reaches, which together with devices about to be described constitute the means engaging the leaf as it is further forwarded through the machine.

Fixed to either one or both of the sprocket chains 50 and 55 are suitable stem spacing and gripping devices, the embodied form thereof comprising recesses or pockets 60 affixed to or formed in the links of one or both of the sprocket chains. The previously stemmed ends are received into the recesses or pockets 60 and are thereby spaced and are gripped between the conveyers during the succeeding stemming action, and they continue to grip the stems after the stemming action is completed, and convey them onward to the place of discharge.

Means are provided, as already referred to, for receiving the clean portion of the stems and for leading or inducting them into the conveyer mechanism just described preparatory to cleaning the remainder of the leaf. As embodied (Figs. 1, 4 and 5) said means comprise a toothed wheel 65, fixed on the shaft 58 to rotate therewith, this wheel being located in between, and coöperating both with the primary conveyers 2 and 15 and the second conveyers 50 and 55, at the point where they overlap each other. The toothed wheel 65 is preferably of slightly greater diameter than the sprocket wheels 51 and 56, and thereby will engage with the stripped stems which project from between the conveyers 2 and 15 just after their emergence or release from the first stemming mechanism, the successive stems entering and lying between the teeth of the wheel, the parts being so constructed and arranged that the stems will be led into the pockets 60 on the conveyers 50 and 55.

By reason of the wheel 65 having a greater peripheral speed than the lineal speed of the first conveyers, the stems after engagement with the wheel are spaced apart and are turned or straightened from their backward inclination until they are substantially straight or nearly so at the moment they are fed into the grip of the second conveyer. Coöperating with the wheel 65, if desired, there may be means for preventing upward flying or bending of the stems, and for directing them into the bight of the continually converging and endlessly moving conveyers 50 and 55. As embodied, such means comprise a disk or collar 66 mounted on the shaft of sprocket wheel 51, between it and the toothed wheel 65, the stems passing beneath the rotating disk 66, which prevents the stems from flying upwardly and coöperates with the wheel 65 to lead them in the desired position and condition into the bight of the second conveyer.

As the leaf passes into the grip or bight of the second conveyer as just described, or very shortly subsequent thereto, the unstemmed portion of the leaf emerges from between the primary conveyers 2 and 15. By reason of the difference in speed of the two conveyers, the successive leaves will be spaced apart and the stemmed and unstemmed portions of the leaf will be straightened out. Means are provided at this point, that is, just after the unstemmed portion of the leaf has emerged from the first conveyers 2 and 15 for aiding in straightening out the stemmed and unstemmed portions of the leaf, for smoothing it out and bringing it at right angles to the second stemming means preparatory to its entering said means. The mechanism just described or devices coöperating therewith, also separates out any of the leaf tobacco having broken stems, or which is otherwise unfitted to pass successfully through the final stemming mechanism.

The embodied form of said means comprises (Figs. 1 and 6) a shaft 67 journaled diagonally in the machine frame, and carrying a roll or carrier 68 fixed thereon to rotate therewith. Mounted on a carrier 68 are longitudinally disposed resilient or yielding leaf engaging members, such as rows of bristles 70 and 71, which project outwardly, and preferably tangentially rather than radially. A coöperating shaft 72 is journaled in the machine frame just beneath and parallel with the shaft 67, and has fixed thereupon, to rotate therewith, a carrier 73, from which carrier projects outwardly one or more resilient members 74 preferably having a smooth surface, and which may be of tangential or involute or other curved conformation. The member or members 74 are resilient or yielding, so as to bring the leaf against the bristles 70 or 71 without driving them thereinto, as a smoothing and straightening but not a stemming action is desired at this time.

Just before the entry of the leaf into the mechanism just described and after it has emerged from the primary conveyers 2 and 15, and by reason of its being supported only by the stems and through the action of the mechanism just described all broken stemmed leaf is here discarded or dropped. The dropped leaf may be received into a hopper to be passed thereby to the floor beneath, or it may be otherwise disposed of.

The mechanisms are preferably so disposed and arranged that just as the leaf emerges from the first conveyer it passes to the leaf straightening and droppings removing mechanism, and as it emerges therefrom, it passes to the second stemming mechanism, which completes the stemming operation.

The means for stemming the remainder of the leaf, comprises two coöperating members rotating against the advancing leaf and at different peripheral speeds, so that they have relative motion with respect to each other at the place or point of the stemming action and the more rapidly rotating member has a more aggressive stemming action upon the leaf by reason of its greater peripheral speed, and is preferably more resilient in its action. The other of said coöperating stemming members is more resistive to the passing leaf than the resilient member just described and thereby offers greater resistance to the advancing leaf, the two members having thus unequal action upon each other and upon the advancing leaf. Other features conducing and coöperating to effect clean and economical stemming which is very rapid and commercially satisfactory will be pointed out hereinafter.

In the preferred embodiment said means, (Figs. 1 and 7) comprise a pair of shafts 85 and 86 arranged parallel with each other and one above the other, and positioned obliquely or diagonally with respect to the conveyers 50 and 55, and suitably journaled in the machine frame. On the shaft 85, fixed to rotate therewith, but adjustable thereabout and therealong, is a carrier 77, provided with longitudinally disposed circumferentially spaced apart groups or lines of resilient stemming devices, as bristles 88 and 89. Coöperating therewith is a carrier 90, which is mounted on shaft 86 to rotate therewith but is adjustable thereabout and therealong, and upon the carrier 90 are arranged stemming devices which coöperate with the stemming devices upon the carrier 87.

In the embodied form thereof, the stemming devices on the carrier 90 are arranged in two diametrally separated or disposed groups, each group comprising preferably a plurality of longitudinally-disposed plates or cutters, having cutting or stemming edges and having stem grooves and intervening higher parts, the plates or cutters being set or positioned longitudinally side by side. As embodied, two series of three such plates each are provided, and are located diametrally opposite each other; a plate 91 being inclined outwardly with respect to the circle or path of rotation of the device, and succeeding and successively adjacent corrugated plates 92 and 93 being likewise inclined with respect to the radii or the peripheral path of travel of the stemming device. The plates or stemming cutters are preferably relatively resistive and unyielding.

These stemming plates are provided with stem grooves, formed preferably by bending or curving the stemming plates in short bends or curves and preferably substantially sinusoidally, a stem dropping or passing therein to or from one stem groove to another at each passage of the respective plates past the stemming point or position. The resilient bristles or like members on the other roll press the leaf downwardly on each side of the stem as it is drawn along the groove, and the front edge of each stemming plate acts as a stemming cutter to remove the leaf cleanly and closely from the stem without tearing the leaf. At the same time, while the bristles are resilient they are traveling at a greater peripheral speed and are thus more aggressive in their stemming action, the action of the two stemming members being different in kind and unequal both with respect to each other and to the leaf. There is thus effected a sweeping action of the bristles 88 and 89 over the flat sides of the plates 91, 92 and 93, due to the difference in peripheral speed. At the same time, the edges of the plates 91, 92 and 93, meet the oncoming leaf at each side of the stem as already described. Also, when the bristles 88 and 89 pass over the edges of the respective blades, the bristles are flexed somewhat and then released. This action will be best understood from Figs. 7 and 8. This action of the resilient bristles keeps the leaf cutting or stemming edges of the plates clean, prevents the leaf from wrapping thereabout, and secures a uniformly efficient stemming action. It also prevents hooking and throwing about of the leaf by the stemming plates and secures uniform delivery of the leaf at the desired place. By this coaction of the members also, the stemming plates continually clean the leaf out of the bristles so that there is no clogging thereof with the leaf or fiber.

By reason of the speed of rotation of the parts just mentioned being relatively great with respect to the speed of the conveyers 50 and 55, each leaf is engaged a plurality of times by each group of stripping devices, as well as by the various edges of each group, as just described, and the operation comprises a very rapid succession of stemming operations or partial removals of the leaf down the stem as the leaf passes through with its stem in the grip of the conveyer.

In the present embodiment also, the bristles or like resilient stemming devices are of greater diameter than the coöperating stemming device having the plates 91, 92 and 13. With equal gears, this gives the bristles higher speed. The higher speed of the bristles or other yielding means and the greater diameter of the bristle roll sweeps the leaf back and away from the stemming devices and downwardly from the place of stemming toward the receiving hopper.

It is desirable to stop the stemming operation at some distance away from the point of the leaf, and to preserve the forward or point end of the stem with the leaf, and in doing this to cut off the stem close to the leaf, so as not to leave a projecting part or stub of the stem, and means for effecting this are provided. In the embodied form of such means, a cutter 76 is provided on the stemming roll 77 on shaft 85, which cutter engages or contacts with a coöperating member 78 on the roll 90 on shaft 86. In said embodiment, the cutting point or place is outside and forward of the point of contact of the stemming members. The cutter 76 travels at a higher speed than its coacting member 78, and overtakes it during their rotation (as will be seen from Figs. 8 and 7) to effect the cutting, the cutting point being determined or affected by the relative peripheral speed of the cutting members. By so cutting in advance of the stemming place or point, the stem is cut off right up to the unstemmed portion of the leaf, the stemmed leaf ends thus being delivered in the most acceptable commercial form. The cutter 76 and its coöperating member 78 are movable or adjustable longitudinally of their respective rolls by bolt and slot mountings 79, whereby the distance from the conveyers at which the stems are cut off is nicely regulated or determined. The successive leaves are drawn along, spaced apart in the grip of the conveyers, and by reason of the forward travel of the conveyer, the leaves have been engaging the stemming mechanism farther and farther along the rotating stemming devices, as well as farther and farther down the leaf (as will be seen from Fig. 1ª). As the stemming proceeds down the leaf, and the leaf is moving farther and farther outwardly along the stemming devices, it comes into alinement with the cutting devices 76 and 78, at a definite predetermined distance along the leaf, and the stem is severed by the cutting devices, and the forward end of the leaf drops, with the forward end of the stem attached, into a suitable receptacle such as a hopper 102, and usually passes therethrough to the floor or story beneath.

Means are provided by the invention for deflecting the stemmed leaves and parts of leaves downwardly out of the path of the oncoming leaves which are approaching the stemming rolls in the grip of the conveyer. The stemmed leaf is deflected downwardly and at a tangent or in a direction determined by the radius and relative speed of the smaller stemming roll. As embodied, a loose resilient buffer or striker 80 is attached to roll 77 and extends down forwardly of the groups of bristles 88 or 89 and engages the leaf in front of the stemming devices and counteracts any tendency of the leaf to wrap about the bristle roll. By reason of the bristles moving at higher speed than the coöperating roll, the bristles have somewhat of a forwardly sweeping action. The bristles being on a larger diameter also conduces to this result. By the coaction of the foregoing the stemmed leaf is directed or deflected downwardly in the manner described.

Suitable tension or conveyer grip regulating devices are provided, operating upon the conveyer while the leaf is being subjected to the final stripping operation, and at any other desired point along the conveyer. In the embodied form thereof, such tension mechanism may be the same or similar to that previously described in connection with the primary conveyers, which is indicated by reference numerals 40 to 47 in Figs. 1, 2, 12 and 13, and need not be again described in detail. It is indicated generally by reference numeral 103, in Figs. 1ª and 14, and provides independent and variable tension regulation at all the various points in the path of travel of the sprocket chains of the second conveyer similarly to the action of the first tension device on the conveyer belts as desired.

Means are provided also for regulating the tension upon the upper reach of conveyer 50, and as shown herein comprise a pulley roll 104, mounted on a stub shaft 105 carried in a bracket 106, fixed to the machine frame by pivot bolt 107, whereby the pulley 104 may be raised and lowered to vary the tension upon the conveyer.

Means are provided for insuring the discharge of the stripped and cut-off stems from the conveyers 50 and 55 and as embodied a stripping device 108 is supported at 109 on the machine frame, and extends either side of the sprocket chain 55, and insures the displacement and discharge of the stems.

The invention in its broader aspects is not limited to the details of construction and arrangement herein shown and described, nor to any particular details, but changes may be made therein without departing from the principles of the invention, and without sacrificing its chief advantages.

What I claim is:—

1. A tobacco stemming machine including in combination a pair of leaf conveyers traveling side by side, one conveyer being longer than the other, a belt superposed upon the long conveyer, the long conveyer and superposed belt having coacting stem flexing and gripping devices, and means for stemming the projecting butt part of the leaf after it has passed the short conveyer and while it is held by the flexing grip between the other conveyer and the belt.

2. A tobacco stemming machine including in combination a pair of leaf conveyers traveling side by side, one conveyer being longer than the other, a belt superposed upon the long conveyer, the long conveyer and superposed belt having coacting stem flexing and gripping devices, and stem butt cleaning rolls arranged diagonally with respect to the conveyers, and acting to stem the butt end of the leaf and to bend the stems backwardly perpendicularly to the axis of the rolls whereby the pull of the rollers is at angle to the main line of the stem.

3. A tobacco stemming machine including in combination a pair of conveyers traveling side by side, one conveyer being longer than the other, an alining gage for the stems at the outer side of the short conveyer, a belt superposed upon the long conveyer on the side adjacent the short conveyer, and means beyond the short conveyer and alongside the other conveyer and belt for stemming the butt of the leaf while held by the said conveyer and belt, said butt stemming means acting upon the stem at an angle to the line of the remainder of the stem.

4. A tobacco stemming machine including in combination a primary leaf conveyer and means diagonally disposed relatively thereto and coöperating therewith for stemming the butt end portion of the leaf, a second conveyer extending in the same direction and traveling at greater speed than the primary conveyer and engaging the cleaned portion of the stems, and means for stemming the remainder of the leaf while conveyed by said second conveyers.

5. A tobacco stemming machine including in combination a primary conveyer, butt stemming means coöperating therewith to stem the leaf butts, a second conveyer having pockets and presenting a continuously open entrance for the cleaned leaf stems, means for speeding up the stems and passing them into the pockets of said second conveyer, and means coöperating with said second conveyer for stemming the main portion of the leaf.

6. A tobacco stemming machine including in combination a primary conveyer, means for stemming the butt of the leaf while held by said primary conveyer, a second conveyer, two rotating devices engaging from opposite sides the successive stems of the partially stemmed leaf and leading them into said second conveyer, and means for stemming the remainder of the leaf.

7. A tobacco stemming machine including in combination a conveyer, means for stemming the leaf held by the conveyer, and means comprising a rotating group of bristles and a yielding member coöperating therewith from the opposite side of the leaf for separating out loose and broken stem leaf before it enters the stemming means.

8. A tobacco stemming machine including in combination a conveyer, means set diagonally to the path of travel of the conveyer and comprising coöperating rotating leaf stemming devices and rotating stem cutting devices for cutting the stem before the leaf is entirely stemmed, the cutting devices acting to cut the leaf stem at a point a little farther toward the leaf tip than the point at which the stemming devices are acting when the stem is cut.

9. A tobacco stemming machine including in combination a conveyer, means set diagonally to the path of travel of the conveyer and comprising coöperating rotating leaf stemming devices and rotating stem cutting devices for cutting the stem before the leaf is entirely stemmed, the cutting devices acting to cut the stem at a point a little nearer to the tip than the place where the stemming devices are acting on the leaf when the cut occurs, the cutting device cutting the stem after a plurality of operations of the stemming devices on the leaf.

10. A tobacco stemming machine including in combination two coöperating rotary stemming members, one of said members having on its periphery a stem receiving groove having leaf engaging faces adjacent thereto and the other member having resilient stemming means, the resilient stemming means having greater peripheral speed than the coöperating grooved member, and means for passing tobacco leaves between said members during rotation.

11. A tobacco stemming machine including in combination two coöperating rotary stemming members, one of said members having on its periphery a stem receiving groove having leaf engaging faces adjacent thereto and the other member having resilient stemming means, the resilient stemming means having greater peripheral speed than the coöperating grooved member, and means for drawing tobacco leaves in the opposite direction from that in which the members are moving at the place of stemming.

12. A tobacco stemming machine including in combination two coöperating rotary stemming members having different peripheral speeds, said members being equipped with different leaf engaging means, one of said members being more resistive to the passing leaf and the other member having more aggressive action due to its speed and sweeping across the surface of the more resistive member during rotation, and means for drawing the leaf between said stemming members.

13. A tobacco stemming machine including in combination two coöperating rotary stemming rolls, one of which offers more resistance to the advancing leaf than the other, the other of said rolls being provided with circumferentially spaced apart stemming devices whereby the leaf is alternately engaged by said stemming devices and is separated therefrom, and means for causing the leaf to feed endwise of the rolls, and means for driving the roll offering the least resistance to the advancing leaf at a greater peripheral speed than the other roll.

14. A tobacco stemming machine including in combination two oppositely rotating stemming rolls having contacting and non-contacting segments, the contacting segments of one roll being provided with cutting blades for removing the leaf from the stem and those of the other roll being provided with resilient stemming material, and means for drawing leaves between said rolls while in action and means for rotating said rolls in opposite directions.

15. A tobacco stemming machine including in combination two coöperating stemming rolls of unequal size, one of said rolls being provided with blades having stem grooves having stemming faces at their sides, the other being provided with separated resilient stemming segments, the rolls being spaced to press said resilient segments into contact with the blades of the complementary roll, and means for drawing leaves between said rolls while they are rotating.

16. A tobacco stemming machine including in combination an endless stem gripping carrier, a pair of coöperating stemming rolls arranged at an oblique angle therewith, means for feeding a leaf sidewise in relation to said carrier, one of said rolls having a cutter, a member on the coöperating roll adapted to contact with the cutter, and means for drawing a stem between said cutter and said contacting member at a predetermined point, said cutter traveling at a higher peripheral speed than the contacting member.

17. A tobacco stemming machine including in combination an endless stem gripping carrier, a pair of coöperating stemming rolls arranged at an oblique angle therewith and traveling at different peripheral speeds, means for feeding a leaf sidewise in relation to said carrier, one of said rolls having a cutter, a member on the coöperating roll adapted to contact with the cutter, the cutter contacting with the contacting member a point determined by the relative peripheral speeds of the rotating members.

18. A tobacco stemming machine including in combination an endless stem gripping carrier, two coöperating stemming rolls angularly disposed to said carrier, said rolls having stemming members contacting at a predetermined point, one of said rolls carrying a cutter, the other having a contacting member, said cutter contacting with its contacting member at a point in advance of the stemming members.

19. A tobacco stemming machine including in combination an endless stem gripping carrier, two coöperating stemming rolls angularly disposed to said carrier, said rolls having stemming members contacting at a predetermined point, one of said rolls carrying a cutter, the other having a contacting member, said cutter contacting with its contacting member at a point outside the contacting point of said stemming members, the roll on which the cutter is mounted traveling at a higher peripheral speed than the contacting member.

20. A tobacco stemming machine including in combination two coöperating stemming rolls, two endless carriers arranged obliquely thereto and having curved links constituting stem pockets on their inner surfaces, means for guiding stems into said pockets and means for flexibly forcing the carriers into contact with said stems while they are in said pockets, and while the carriers are advancing past the angularly arranged stemming rolls, and means for rotating the rolls in opposite direction to the traveling leaves.

21. A tobacco stemming machine including in combination a pair of stemming rolls angularly arranged relatively to said carriers, one of said rolls being smaller in diameter than the other, means for drawing a leaf between said rolls, the larger roll being provided with bristles and being located above the smaller, and means mounted on one of the rolls for deflecting the stemmed portion of the leaf downwardly and away from the larger roll.

22. A tobacco stemming machine including in combination two endless carriers, means for forcing said carriers into contact with a stem, a pair of stemming rolls angularly arranged relatively to said carrier, one of said rolls being smaller in diameter than the other, means for drawing a leaf between said rolls, means for deflecting the stemmed portion of the leaf in a tangential direction controlled by the leaf engaging means on the smaller roll.

23. A tobacco stemming machine including in combination a pair of coöperating stemming rolls, one of said rolls having resilient stemming segments and the other roll a series of stemming blades on its periphery arranged in separated groups, said blades being provided with stem grooves and intervening raised portions, and being arranged at an angle relatively to the body of said rolls.

24. A tobacco stemming machine including in combination stemming means, and leaf smoothing and directing means acting on the leaf in advance of the stemming means and comprising a row of rotating bristles mounted on a shaft and a relatively loosely yielding resilient member coöperating therewith mounted on another shaft on the opposite side of the leaf.

25. A tobacco stemming machine including in combination stemming means, and leaf smoothing and directing means acting on the leaf in advance of the stemming means and comprising a row of rotating bristles inclined backwardly from their direction of rotation and a relatively loosely yielding resilient member coöperating therewith on the opposite side of the leaf.

26. A tobacco stemming machine including in combination a rotating stemming member having grooves with a stemming edge, and a resilient rotating stemming member coöperating from the opposite side of the leaf to press the stem against said stemming edge and to press the leaf closely on each side of the stem past and in front of the rotating stemming edge, and means for drawing the leaf against said members.

27. A tobacco stemming machine including in combination a plurality of rotating grooved stemming edges following in succession, a rotating member coöperating from the opposite side of the leaf to press the stem against the stemming edge and to press the leaf past and in front of the advancing stemming edge, and means for drawing the leaf against the rotation of said devices which operate a plurality of times in quick succession on a single leaf.

28. A tobacco stemming machine including in combination means for feeding the leaf through stemming means and stemming means comprising two coöperating rotating members, one member having a rotating plate, the edge thereof engaging the leaf during the stemming operation, and the other of said coöperating members having a group of flexible members sweeping over the side of the plate and said edge thereof.

29. A tobacco stemming machine including in combination means for feeding the leaf through stemming means, and stemming means comprising two coöperating rotating members, one member having a rotating plate, having a corrugated edge engaging the leaf during the stemming operation, and the other of said coöperating members having a group of bristles sweeping over the side of the plate and said edge thereof.

30. A tobacco stemming machine including in combination means for feeding the leaf through stemming means, and stemming means comprising two coöperating rotating members, one member having a rotating plate, the edge thereof engaging the leaf during the stemming operation, and the other of said coöperating members having a group of flexible members sweeping over the side of the plate and said edge thereof, the flexible members traveling at greater peripheral speed than the plate.

31. A tobacco stemming machine including in combination means for feeding the leaf through stemming means, and stemming means comprising two coöperating rotating members, one member having a rotating plate, having a corrugated edge engaging the leaf during the stemming operation and the other of said coöperating members having a group of flexible members sweeping over the side of the plate and said edge thereof, the flexible members traveling at greater peripheral speed than the plate.

32. A tobacco stemming machine including in combination means for feeding the leaf through stemming means, stemming means comprising two coöperating rotating members, one member having a plate disposed longitudinally thereof, and being inclined outwardly with respect to its circle of rotation, the forward edge of the plate engaging the leaf during the stemming operation, the other of said coöperating members having a group of flexible members sweeping over the side of the plate and said edge thereof.

33. A tobacco stemming machine including in combination means for feeding the leaf through stemming means, stemming means comprising two coöperating rotating members, one member having a plate disposed longitudinally thereof, and being inclined outwardly with respect to its circle of rotation, the forward edge of the plate engaging the leaf during the stemming operation, the other of said coöperating members having a group of flexible members sweeping over the side of the plate and said edge thereof, the flexible members traveling at greater peripheral speed than the plate.

34. A tobacco stemming machine including in combination means for feeding the leaf through stemming means, stemming means comprising two coöperating rotating members, one member having a plate disposed longitudinally thereof, and being inclined outwardly with respect to its circle of rotation, the plate having a corrugated edge engaging the leaf during the stemming operation, the other of said coöperating members having a group of flexible members sweeping over the side of the plate and said edge thereof.

35. A tobacco stemming machine including in combination means for feeding the leaf through stemming means, stemming means comprising two coöperating rotating members, one member having a plate disposed longitudinally thereof, and being inclined outwardly with respect to its circle of rotation, the forward edge of the plate engaging the leaf during the stemming operation, the other of said coöperating members having a group of bristles sweeping over the side of the plate and said edge thereof, the bristles traveling at greater peripheral speed than the plate.

36. A tobacco stemming machine including in combination means for feeding the leaf through stemming means, and stemming means comprising two coöperating members, one member having a plurality of flat plates disposed longitudinally thereof and arranged close to each other circumferentially thereabout, the edges of the plates engaging successively with the leaf during the stemming operation, the other of said coöperating members having a group of flexible devices sweeping in rapid succession over the flat sides and edges of said closely arranged blades.

37. A tobacco stemming machine including in combination means for feeding the leaf through stemming means, and stemming means comprising two coöperating members, one member having a plurality of flat plates disposed longitudinally thereof and arranged close together and substantially parallel to each other, the edges of the plates engaging successively with the leaf during the stemming operation, the other of said coöperating members having a group of flexible devices sweeping in rapid succession across the flat sides and over the edges of said closely arranged plates and the edges thereof, the flexible members traveling at greater peripheral speed than the plates.

38. A tobacco stemming machine including in combination means for feeding the leaf through stemming means, and stemming means comprising two coöperating members, one member having a plurality of flat plates disposed longitudinally thereof, and arranged close together and substantially parallel to each other, one of the edges of each of the plates being corrugated to receive the stem and to provide stemming faces at either side of the stem, said edges engaging successively with the leaf during the stemming operation, the other of said coöperating members having a group of flexible devices sweeping successively over the flat sides and corrugated edges of the closely arranged blades.

39. A tobacco stemming machine including in combination means for feeding the leaf through stemming means, and stemming means comprising two coöperating members, one member having a plurality of flat plates disposed longitudinally thereof, and arranged circumferentially thereabout, the edges of the plates being corrugated and engaging successively with the leaf during the stemming operation, the other of said coöperating members having a group of flexible devices sweeping over the flat sides of a plurality of the blades and the corrugated edges thereof, the flexible members traveling at greater peripheral speed than the blades.

40. A tobacco stemming machine including in combination means for feeding the leaf to stemming devices, stemming devices, and cutting means for cutting the stem at a point along the leaf slightly in advance of the place of the stemming action, thereby terminating the stemming action on the leaf and cutting the stem at the unstemmed portion of the leaf.

41. A tobacco stemming machine including in combination means for feeding the leaf to stemming devices, stemming devices, cutting means for cutting the stem at a point along the leaf slightly in advance of the place of the stemming action, thereby terminating the stemming action on the leaf and cutting the stem at the unstemmed portion of the leaf, and means for causing said cutting devices to so act at a desired and predetermined point along the leaf.

In testimony whereof, I have signed my name to this specification, in the presence of a subscribing witness.

JAMES P. SCOVILL.

Witness:
JOHN D. MORGAN.